(12) United States Patent
Harris

(10) Patent No.: US 8,351,761 B2
(45) Date of Patent: Jan. 8, 2013

(54) COMMERCIAL SKIPPING STANDALONE DEVICE

(75) Inventor: Scott C. Harris, Rancho Santa Fe, CA (US)

(73) Assignee: Harris Technology, LLC, Rancho Santa Fe, CA (US)

( * ) Notice: Subject to any disclaimer, the term of this patent is extended or adjusted under 35 U.S.C. 154(b) by 2802 days.

(21) Appl. No.: 10/455,854

(22) Filed: Jun. 6, 2003

(65) Prior Publication Data

US 2009/0097814 A1    Apr. 16, 2009

(51) Int. Cl.
*H04N 9/80* (2006.01)
*H04N 5/783* (2006.01)

(52) U.S. Cl. ........................... 386/249; 386/344

(58) Field of Classification Search .............. 386/1, 46, 386/95, 96, 52–55, 111–112, 121, 125, 126
See application file for complete search history.

(56) References Cited

U.S. PATENT DOCUMENTS

| | | | |
|---|---|---|---|
| 5,696,866 A * | 12/1997 | Iggulden et al. | 386/46 |
| 5,771,307 A * | 6/1998 | Lu et al. | 382/116 |
| 5,973,723 A | 10/1999 | DeLuca | |
| 6,404,977 B1 * | 6/2002 | Iggulden | 386/46 |
| 6,469,749 B1 * | 10/2002 | Dimitrova et al. | 348/722 |
| 6,504,990 B1 * | 1/2003 | Abecassis | 386/283 |
| 6,510,458 B1 * | 1/2003 | Berstis et al. | 709/219 |
| 7,269,330 B1 * | 9/2007 | Iggulden | 386/248 |
| 2002/0097979 A1 * | 7/2002 | Lowthert et al. | 386/46 |
| 2004/0086261 A1 * | 5/2004 | Hanes | 386/52 |
| 2004/0226035 A1 * | 11/2004 | Hauser, Jr. | 725/9 |

* cited by examiner

*Primary Examiner* — William C Vaughn, Jr.
*Assistant Examiner* — Heather Jones
(74) *Attorney, Agent, or Firm* — Law Office of Scott C. Harris, Inc.

(57) ABSTRACT

Specified video segments within a video stream are identified. The identified video can represent commercials or can represent portions within the program information. The user can identify these undesired portions of the video. A signature generation unit produces a signature that indicates information about the undesirable video. The signatures are stored. Current video is compared with the signatures to identify portions of the video that correspond to the specified video segments. The identified portions are handled in a different way, for example, they can be played less prominently, or skipped. The signal indicative of the video stream can be produced at a different time than the signature generation. In addition, the signature generation can use biometric techniques.

30 Claims, 2 Drawing Sheets

COMMERCIAL SKIPPING STANDALONE DEVICE

BACKGROUND

Attempts to skip commercials in broadcast TV are well-known. Many of these attempts correlate over the video in order to identify portions of the video which are likely to represent commercials. So-called replayTV units, available from Sonic Blue Inc., form a digital VCR which digitizes the incoming television and records it on a hard drive. The digital VCR records the signal, forms some kind of index that has information for use in locating the commercials, and during playback, automatically skips these commercials.

This device may work remarkably well, however there are concerns that such a device may violate copyright laws. Moreover, there are times when a user might want to skip other sections of video that are not commercials.

SUMMARY

The present invention teaches a system in which the user controls various aspects of the video identification and playback in order to identify and later skip desired selections. The identification unit may be totally separate from the device that actually does the recording. In addition, a preferred operation is responsive to user input to form specified signatures representing the undesired video. Since the user selects which parts of the video are undesired, the user has control over which parts of the video may be automatically skipped. The identification unit may index the recording by analyzing the recording to determine likely commercials. Different embodiments of this system are disclosed.

BRIEF DESCRIPTION OF THE DRAWINGS

These and other aspects will now be described in detail with reference to the accompanying drawings, wherein.

DETAILED DESCRIPTION

Figure 1:
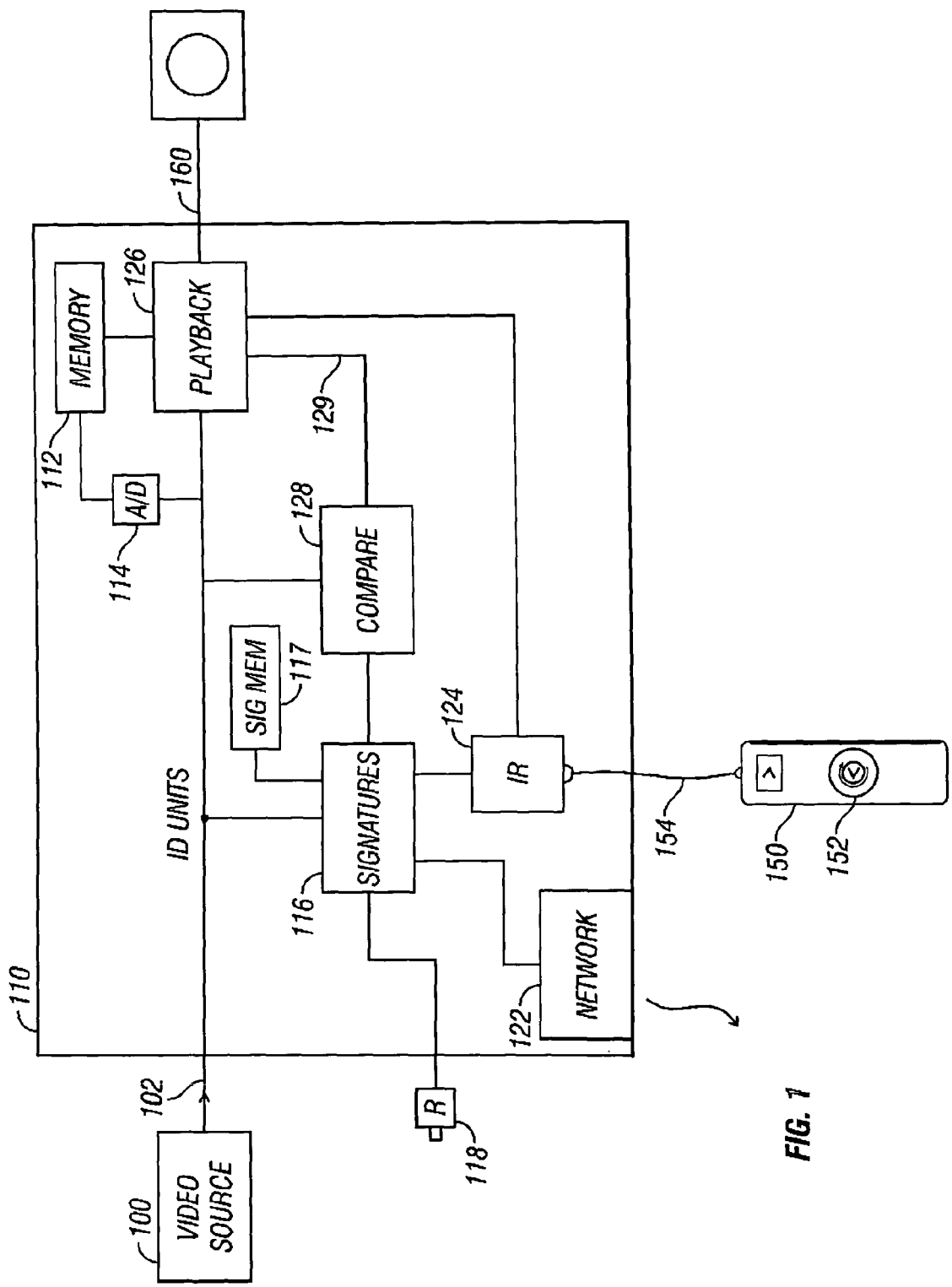
FIG. 1 shows a first embodiment in which a special identification unit is used to analyze video content and skip over portions of the video content based on user-identified criteria.

FIG. 1 shows a video source 100 which produces output video 102. Depending on the configuration of the device, the video 102 may be analog or digital signals. The video source may be a conventional source of broadcast video such as a television tuner, or a cable or digital cable line, satellite receiver, or the like. Video source may also be a digital tape recorder such as a replay TV type unit or TIVO, or ultimate TV type unit. The video signal 102 is input into the ID unit 110. ID unit 110 has an internal memory 112 which stores some portion of the incoming video. In one specific embodiment, the memory may be for example 1 GB of memory, in either a miniature hard drive or in random access memory, capable of storing approximately one half hour of playback video. Of course, the memory may be larger as desired. However, storage of one half hour of video will enable most desired commercial skipping operations.

The incoming video is coupled to the memory 112 and an A/D converter unit 114 may optionally be provided to digitize the signal in the case of an analog input. When signal is applied to the A/D unit, it immediately begins recording.

The ID unit also includes a signature memory 116 which may be a nonvolatile memory that stores signatures indicative of known undesired video segments. The signature may be very simple for example may be average luminance of the undesired video, or may be much more complex. Any type of signature which is known in the art to represent video or video segments can be used. One simplistic signature may be average luminance. Another is described in U.S. Pat. No. 5,581,658. Other signatures can alternatively be used; any signature that characterizes the video signal. According to an embodiment disclosed herein, a special signature is recorded which may be advantageous in analyzing the content of a commercial, although other signatures of sex scenes, violence scenes and the like may alternatively be provided.

The signatures in the signature store 116 may be changed as desired. Signature store 116 is shown connected to a network connection 122 which enables the signatures in the unit to be updated via network. This may be part of a subscription service or a free service on the Internet that identifies known commercials and/or undesired video. For example, this may be used to identify sex scenes and/or violence scenes in known videos, to allow skipping over those scenes. When used in this way, this system may be used to edit out certain scenes during playback.

Another and more preferred way of storing the signatures is by having the user identify the undesired video. A special remote control 150 is provided for use with the device 110. The remote control 150 includes a undesired video identifying ("UVI") button at 152. When depressed, the undesired video button 152 sends a signal 154 to a corresponding infrared receiver of conventional type 124, located within unit 110. Preferably, the user holds down the UVI button 124 for the entire duration of the undesired scene. During the time that the UVI button is being depressed, the unit does two things: first it sends a signal to the signature unit 116 indicating that the incoming video represents undesired video. This incoming video is then stored for later processing to form a signature indicative of that undesired video. In addition, the unit may send a signal to the playback unit 126 which controls playback of the stored information from memory 112. This causes the playback unit to either skip a specified period (e.g. 30 seconds), or play the video at faster speed, for example at a double-speed or quadruple speed as conventional. Therefore, the user sees the video at faster-then-usual speed and at the same time marks it as being an undesirable part of the video.

In an alternative embodiment, only the beginning of the undesired portion is marked by pressing the UV button 152 only one time, right at the beginning of the undesired portion. The signature formation unit 117 then automatically identifies the end of the current scene (or commercial) and automatically forms a signature.

As described above, this system may be used for skipping many kinds of video content. In addition, alternative ways may be used for identifying the commercials. For example, a single depression of the commercial button may be used to identify a commercial break, and video processing techniques may be used to determine the end of the commercial break or the end of the scene being viewed. For example, when there is a change in the luminance of the scene by more than 10%, this may signify that the end of the scene is being viewed.

An advantage of this system is that the user forms and stores their own signatures. The user can select what parts of the video to be watched and other parts that are not being watched. If the user desires to see some commercials or other video, the user can see those. Alternatively, however, the user can skip other commercials by entering signatures into the unit 116. In addition, the signature unit may include a reset button 118 which may be used in order to clear the signature store and start over.

However formed, video 102 is compared with the signatures in store 118 by a comparison unit 128. The comparison unit compares the incoming video with the signatures and produces an output signal 129 which may indicate "skip during play". The output signal 129 controls the playback unit 126. Therefore, if the comparison unit 128 detects a 25 second commercial, it may produce a digital signal at 129 which tells the playback unit to skip forward by 25 seconds.

In operation, a video source is applied, and automatically fills the memory 112 with video. When the user wants to watch that video, preferably at least about a half hour's worth of video storage, or after some certain segment of video has been entered into the playback unit 126, the user selects play on the remote control, causing the playback unit to read from the memory 112 and thereby produce the output video signal 160. During the playback, the video is continually compared with the signatures in unit 116 by comparison unit 128. Any match causes this portion of the playback which is currently identified to be automatically skipped.

Since the user sets the signatures, use of the unit may be less likely to be considered a copyright infringement. In addition, since the ID unit 110 is separate from any recording part, it can be used with many different video sources.

Figure 2:
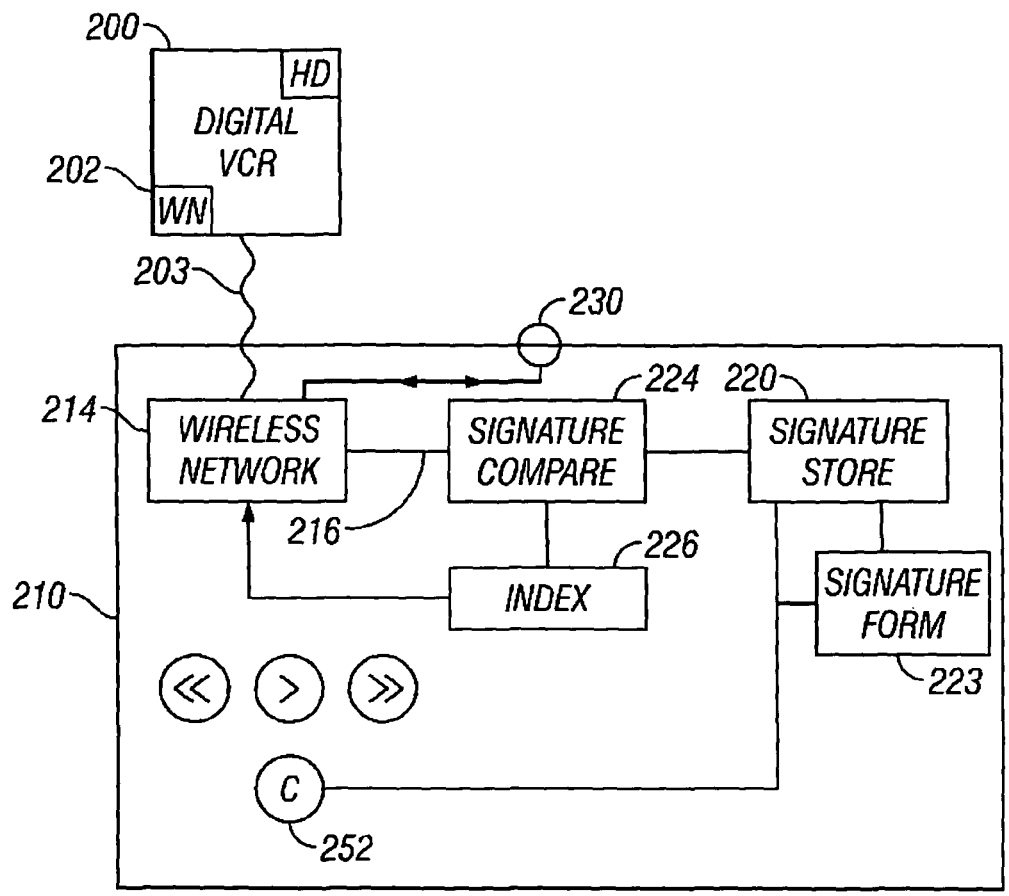
FIG. 2 shows a second embodiment in which a remote control is suitably programmed to carry out the analysis and make determinations of suitable content for skipping

FIG. 2 shows an alternative embodiment in which the undesired video skipping operation is carried out in a remote control unit which interfaces with a digital VCR 200 such as TIVO, TV replay type unit or the like. In this embodiment, both a digital VCR 200, and the remote control 210 include wireless network capabilities, which can be wireless ethernet such as 802.11*a* or 802.11*b* network, a Bluetooth network, or any other type of wireless network command. Digital video recorder ("VR"), 200 includes a wireless network unit 202. Remote control 210 includes a wireless network part 214 which communicates with the corresponding network unit 202 in digital VR 200.

In operation, the remote control 210 includes conventional buttons such as play, fast forward and stop. Remote control 210 also includes a special commercial button 252. This button is depressed to identify a commercial. During playback, digital VR sends information indicative of advanced video which will be played from the hard drive 204 within the digital VR over the wireless network 203 to the remote control. Therefore, the remote control receives information indicative of the video which will be played in the future. In one embodiment, this may be a reduced resolution version of the video, since it will only be used for analyzing signatures. In this embodiment, the signature storage unit 220 is located in the remote control. The video which is received 216 is compared with the signatures in the signature storage unit by comparison device 224. This comparison produces an index 226 which is used to drive the playback. In this embodiment, the control of the digital VR is shown as being carried out over the wireless network, although an infrared control may also be used. For example, if the signature comparer 224 indicates that an undesired video clip is playing, at some future time, an entry in the index unit 226 is made indicating the time. This entry is used to tell that the digital VR to skip over the time that the commercial or undesired video. As in the embodiment of FIG. 1, the UVI button 252 is used to form a signature using the signature forming unit 223 to analyze the incoming video and to store the signature in the signature storage unit 220. Again, this enables skipping any type of undesired video and is not limited to commercials although it may be used for commercials.

Figure 3:
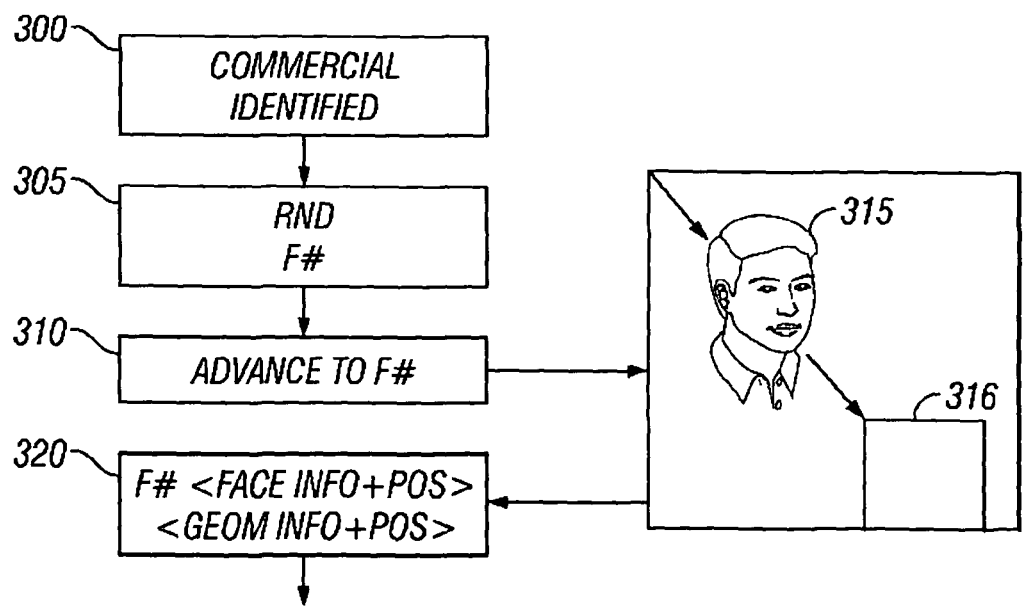
FIG. 3 shows a flowchart of an embodiment used to determine signatures for identifying video sequences.

As noted above, any conventional method known in the art for forming signatures may be used for identifying the undesired portions of video. Any signal that characterizes the video may be used as a signal. However, one specifically advantageous system is shown herein. This may be used, for example, by a processor that is processing the video stream, as shown in the flowchart of FIG. 3. At 300, an UV segment is identified. A random number generator, which may be a software function is then used to generate a frame number. The video is advanced by this frame number to investigate another frame which is then analyzed. Most commercials will include a picture of a person within the commercial. The frame is analyzed from left corner downward to look for a picture of person's face which is identified as face 315. Digital information indicative of the face is stored along with additional information about the face. After storing that face information, the system continues correlating down from the left corner looking for a geometric object of relatively consistent color. The geometric object 316 is found, and information indicative of the geometric object (e.g., it is a of specified size, for example), is stored along with its position. This forms a signature at 320 which includes the frame number, face information and position, and geometric information and position.

An advantage of this signature is that conventional face recognition software may then be used to analyze the incoming video stream to recognize the face. This face recognition software may operate relatively quickly, and is an established technology. In addition, the geometric information may use techniques which are known in video rendering.

This embodiment may be used to identify any biometric part, using biometric identification techniques.

Since the frame number is known, and the number of frames per second in video are known (typically 30 frames per second interleaved), this can be used to identify the beginning point of the commercial. The end point of the commercial may also be identified using conventional techniques.

Although only a few embodiments have been disclosed in detail above, other modifications are possible for example, while the above describes skipping over the undesirable video, it should be understood that any system that allows it to be played less prominently, including playing the undesirable video at a faster speed, muting the undesirable video or lowering the luminance of the undesirable video may also be used.

The invention claimed is:

1. A video identification system, comprising:
   a first unit, that stores plural signatures characterizing segments of video that are requested to be edited during playback;
   a comparing unit which operates to obtain a reduced resolution version of full resolution video which will be played at a future time, and to compare said reduced resolution version of said video that will be played at a future time with said signatures to identify at least one segment of video requested to be edited during playback at said future time and produces an entry indicating at least one time of video to be skipped during playback; and
   a playback part, that automatically determines if current video should be skipped based on said entry created by said comparing unit, and automatically playing said full resolution video that is not associated with an entry indicating that the video should be skipped during playback, and not playing the video when said video is associated with the entry indicating that the video should be skipped during playback.

2. A system as in claim 1, wherein said playback part is within a remote control, and said comparing unit is physically within said remote control.

3. A system as in claim 1, wherein said segments of video are less than an entire video that is being viewed, and each of a plurality of said signatures include a time indicative of a length of a segment of video represented by said each signature, and said comparing unit skips said video by moving a playback forward by said time indicative of said length of said segment of video associated with said each signature.

4. A system as in claim 1, further comprising a network device said plural signatures over a network connection and periodically updating said signatures via the network connection, where said plural signatures that are received over the network connection are received in a form where each said signature is less information than one of said segments of video represented by said each signature, and where said network device carries out said updating to cause new signature information indicative of new segments of video to be used by said comparing unit.

5. A system as in claim 1, wherein said signatures are received in a first form, and are stored in said first unit in said first form, without modifying a content of said signatures prior to storing.

6. A video identification system, comprising:
a first unit that obtains a reduced resolution version of video, and identifies segments of video that are requested to be edited during playback in said reduced resolution version of video;
a signature generation unit, having a control operable by a user, which generates signatures characterizing said segments of video that are requested by a user using said control to be edited during playback, where said segments of video are less than an entire video and are identified within said reduced resolution version of the video; and
a comparing unit which compares current video with said signatures to identify said segments of said video requested to be edited during playback,
wherein said video includes program information and also includes commercials, and wherein said segment of video that is requested by said user using said control to be edited during playback represents at least one portion of the program information that is not commercials and that represents at least one of violence scenes and/or sex scenes in said video,
and where at least a portion of said video other than said segments of video that are requested to be editing during playback are allowed to be played and are played using a full resolution version of the video, and parts which are edited during playback are automatically prevented from being played.

7. A system as in claim 6, wherein said signature generation unit also stores a time of each of a plurality of stored signatures.

8. A system as in claim 6, wherein said signature accessing unit includes a signature that represents a face within a video stream, and a location of said face within said video stream relative to an object in said video stream and said comparing unit includes a face recognition unit that looks for said face within said video stream at said location relative to said object.

9. A video identification system, comprising:
a first unit that obtains a reduced resolution version of video, and identifies segments of video that are requested to be edited during playback in said reduced resolution version;
a signature access unit which accesses at least one signature characterizing said segments of video that are requested to be edited during playback; and
a comparing unit which compares said reduced resolution version with said signature to automatically identify portions of the video requested to be edited during playback, wherein said video includes program information and also includes commercials, and wherein said segment of video that is requested to be edited during playback represents at least one portion of the program information that is not commercials and that represents at least one of violence scenes and/or sex scenes in video, wherein said parts that are not edited during playback are full resolution versions of the video.

10. A system as in claim 9, further comprising a remote control, and wherein said signature access unit and comparing unit are physically within a housing that holds the remote control, wherein said remote control has a control that indicates that currently viewed video represents video requested to be edited during playback when said control is actuated, and produces a signal, sent to said signature accessing unit, indicative of a selection of video segment that are requested to be edited during playback.

11. A system as in claim 10, wherein said signature accessing unit is responsive to said signal that is produced by actuation of said control to produce a signature indicative of said video.

12. A method, comprising:
operating to obtain a reduced resolution version of full resolution video which will be played at a future time, and to analyze the reduced resolution version of said full resolution video;
forming a signal indicative of a portion of a first video stream in said reduced resolution version, which signal includes information indicative of a biometric part within said video stream and a location of said biometric part within said video stream relative to an object within said video stream; and
using said signal, including said information indicative of said biometric part, with a computer that is programmed to automatically recognize said biometric part and said location of said biometric part relative to said object from said signal in a second video stream which is a full resolution video stream, said comparing operating to compare said reduced resolution version of said video that will be played at a future time with said information indicative of said biometric part to identify at least one segment of video requested to be edited during playback at said future time and produces an entry indicating at least one time of video to be skipped during playback; and
based on said using to recognize said biometric part, altering playing of at least a part of the full resolution video stream in which the biometric part was recognized based on said entry.

13. A method as in claim 12, wherein said forming occurs at a first time, and said using occurs at a second time, subsequent to said first time.

14. A method as in claim 12, wherein said signal indicative of said first video stream includes an index signal indicative of times of the portion including at least a time that the video stream takes to play.

15. A method as in claim 14, wherein said altering comprises skipping forward within a video segment by said time that the portion takes to play.

16. A method as in claim 12, wherein said computer is programmed to recognize a geometric object within said video stream, and said location is a location relative to said geometric object.

17. A system comprising:
a stored video unit, which stores a reduced resolution version of video to be played, and also stores identifying information from which sections of said video can be identified during playing; and
said video unit including an interface that receives commands from a remote control unit, wherein a playing command controls playing of said video,
a memory, storing identifying information identifying multiple different sections of video, said video unit recognizing, other sections of video which are similar to said section of video based on said identifying information;
a comparing unit which operates at a current time to compare said reduced resolution version of said video to be played with said identifying information to identify at least one segment of the video requested to be edited during playback and produces an entry indicating at least one segment of video to be skipped during playback; and
a playback part, that receives current full resolution video to be played, automatically determines if the current video should be skipped based on said entry created by said comparing unit, and playing said full resolution video that is not associated with an entry indicating that the video should be skipped during playback, and does not play the video when said video is associated with the entry indicating that the video should be skipped during playback.

18. A system as in claim 17, wherein said identifying information includes information indicative of a biometric part within said video and a location of said biometric part within said video.

19. A system as in claim 17, wherein said video includes program information, and commercial information that is separate from said program information, and wherein at least one item of said identifying information identifies a part of said program information that represents at least one of a sex scene or a violence scene and not said commercial information.

20. A system as in claim 17, wherein said sections of said video which are similar includes a commercial.

21. A system as in claim 17, wherein said remote control unit includes a wireless network protocol, which communicates with said stored video unit.

22. A system as in claim 17, further comprising a network connection, receiving said identifying information over a network connection, storing the identifying information, and periodically updating said identifying information via the Internet, where said identifying information that is received over the network connection is received as less than an entire video portion represented by the identifying information, and where said updating causes new identifying information indicative of new sections of video to be read by said video unit for recognizing said sections of video.

23. A system as in claim 17, wherein said identifying information is received in a first form, and are stored in said memory in said first form, without modifying a content of said identifying information prior to storing.

24. A method, comprising:
reading a reduced resolution information indicative of playing a video stream, said information including both program information parts within the video stream and commercial parts within the video stream;
reading segment information that is indicative of portions of said program information parts and not said commercial parts, within said video stream, wherein said segment information includes information indicative of at least one of violence scenes and or sex scenes in the program information parts;
comparing, at a current time, portions of said reduced resolution information with said segment information to identify at least one segment of the video requested to be edited during playback at said future time and produces an entry indicating at least one time of video to be skipped during playback at said future time;
playing a full resolution video stream, and automatically recognizing portions of the full resolution video stream indicated by said segment information as recognized portions based on said entry created by said comparing, and automatically playing parts of said full resolution video stream that is not associated with an entry indicating that the video should be skipped during playback, and not playing the full resolution video when said video is associated with the entry indicating that the video should be skipped during playback; and
producing an output from said playing, including playing video from portions of said video stream that are not recognized by said recognizing, and a different operation for portions of said video stream that are recognized by said recognizing.

25. A method as in claim 24, further comprising allowing a user to identify parts of said video, and producing said segment information, and wherein said allowing occurs at a first time, and said producing occurs at a second time, subsequent to said first time.

26. A method as in claim 24, wherein said different operation comprises skipping said portions of the video stream recognized by said recognizing.

27. A method as in claim 24, further comprising receiving said segment information over a network connection.

28. A method as in claim 24, further comprising periodically updating said segment information via the Internet, such that new segment information indicative of new portions of said program information parts are read by said reading segment information.

29. A method as in claim 24, wherein said segment information includes information that represents a face within a video stream, and a location of said face within said video stream relative to an object within said video stream and said recognizing looks for said face within said video stream at said location relative to said object.

30. A method as in claim 29, wherein said object is a geometric object within said video stream, and said location is a location relative to said geometric object.

* * * * *